(12) United States Patent
Ramkumar et al.

(10) Patent No.: US 12,062,188 B2
(45) Date of Patent: Aug. 13, 2024

(54) DIFFERENCING BASED SELF-SUPERVISED SCENE CHANGE DETECTION (D-SSCD) WITH TEMPORAL CONSISTENCY

(71) Applicant: NavInfo Europe B.V., Eindhoven (NL)

(72) Inventors: Vijaya Raghavan Thiruvengadathan Ramkumar, Eindhoven (NL); Bahram Zonooz, Eindhoven (NL); Elahe Arani, Eindhoven (NL)

(73) Assignee: NavInfo Europe B.V., Eindhoven (NL)

( * ) Notice: Subject to any disclaimer, the term of this patent is extended or adjusted under 35 U.S.C. 154(b) by 328 days.

(21) Appl. No.: 17/691,397

(22) Filed: Mar. 10, 2022

(65) Prior Publication Data
US 2023/0289977 A1    Sep. 14, 2023

(51) Int. Cl.
G06T 7/20    (2017.01)
G06N 3/088    (2023.01)

(52) U.S. Cl.
CPC ............... *G06T 7/20* (2013.01); *G06N 3/088* (2013.01); *G06T 2207/20081* (2013.01); *G06T 2207/20084* (2013.01)

(58) Field of Classification Search
CPC ............ G06T 7/20; G06T 2207/20081; G06T 2207/20084; G06T 2207/10016; G06N 3/088; G06V 20/00; G06V 10/82
See application file for complete search history.

(56) References Cited

U.S. PATENT DOCUMENTS

| | | |
|---|---|---|
| 10,452,947 B1 | 10/2019 | Ahmed et al. |
| 11,748,988 B1 * | 9/2023 | Chen ...................... G06F 16/78 386/241 |

(Continued)

OTHER PUBLICATIONS

Alcantarilla, Pablo F., et al., "Street-View Change Detection with Deconvolutional Networks", Autonomous Robots, vol. 42, No. 7, 2018, 1301-1322.

(Continued)

*Primary Examiner* — Edward F Urban
*Assistant Examiner* — Wassim Mahrouka
(74) *Attorney, Agent, or Firm* — Peacock Law P.C.; Justin R. Muehlmeyer

(57) ABSTRACT

A computer implemented network for executing a self-supervised scene change detection method in which image pairs (T0, T1) from different time instances are subjected to random photometric transformations to obtain two pairs of augmented images (T0→T0', T0"; T1→T1', T1"), which augmented images are passed into an encoder (fθ) and a projection head (gφ) to provide corresponding feature representations. Absolute feature differencing is applied over the outputs of the projection head (gφ) to obtain difference representations (d1, d2) of changed features between the pair of images, and a self-supervised objective function (LSSL) is applied on the difference representations d1 and d2 to maximize a cross-correlation of the changed features, wherein d1 and d2 are defined as $$d_1 = |g(f(T_0')) - g(f(T_0'))| \quad (1)$$
$$d_2 = |g(f(T_0'')) - g(f(T_1''))|$$

Furthermore, an invariant prediction and change consistency loss is applied in the D-SSCD Network to reduce the effects of differences in the lighting conditions or camera viewpoints by enhancing the image alignment between the temporal images in the decision and feature space.

5 Claims, 1 Drawing Sheet

(56) References Cited

U.S. PATENT DOCUMENTS

2023/0021661 A1     1/2023    Bao et al.
2023/0123493 A1     4/2023    Arani et al.

OTHER PUBLICATIONS

Deng, Jia, et al., "ImageNet: A Large-Scale Hierarchical Image Database", Conference Paper in Proceedings / CVPR, IEEE Computer Society Conference on Computer Vision and Pattern Recognition. IEEE Computer Society Conference on Computer Vision and Pattern Recognition, 2009, 1-8.

Guo, Enqiang, et al., "Learning to Measure Changes: Fully Convolutional Siamese Metric Networks for Scene Change Detection", arXiv:1810.09111v3, 2018, 1-10.

Lei, Yinjie, et al., "Hierarchical Paired Channel Fusion Network for Street Scene Change Detection", arXiv:2010.09925v1, 2020, 1-13.

Sakurada, Ken, et al., "Weakly Supervised Silhouette-based Semantic Scene Change Detection", arXiv:1811.11985v2, 2020, 1-7.

Tung, Frederick, et al., "Similarity-Preserving Knowledge Distillation", arXiv:1907.09682v2, 2019, 1-10.

Zbontar, Jure, "Barlow Twins: Self-Supervised Learning via Redundancy Reduction", arXiv:2103.03230v3, 2021, 1-13.

Chen, Yuxing, et al., "Self-Supervised Change Detection by Fusing SAR and Optical Multi-Temporal Images", 2021 IEEE International Geoscience and Remote Sensing Symposium IGARSS, 2021, 3101-3104.

Chen, Yuxing, et al., "Self-supervised Change Detection in Multi-view Remote Sensing Images", arXiv:2103.05969v1, 2021, 2021.

Chen, Yuxing, et al., "Self-supervised Remote Sensing Images Change Detection at Pixel-level", arXiv:2105.08501v2, 2021, 1-10.

Leenstra, Marrit, et al., "Self-supervised pre-training enhances change detection in Sentinel-2 imagery", arXiv:2101.08122v2, 2021, 1-14.

Ramkumar, Vijaya Raghavan T., et al., "Self-Supervised Pretraining for Scene Change Detection", 35th Conference on Neural Information Processing Systems (NeurIPS 2021), Sydney, Australia, 2021, 1-13.

\* cited by examiner

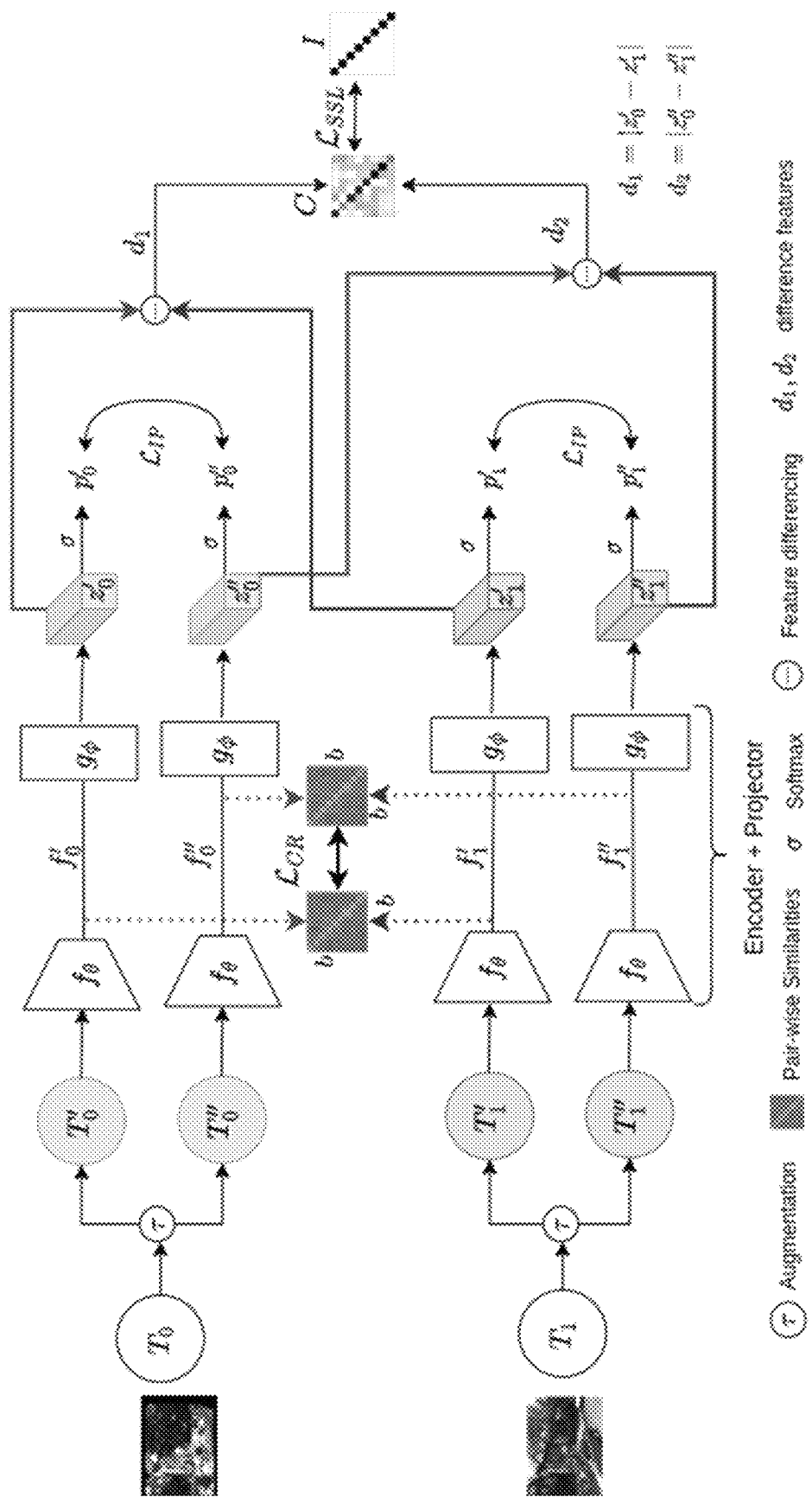

DIFFERENCING BASED SELF-SUPERVISED SCENE CHANGE DETECTION (D-SSCD) WITH TEMPORAL CONSISTENCY

BACKGROUND OF THE INVENTION

Field of the Invention

Embodiments of the present invention relate to a computer implemented network for executing a self-supervised scene change detection method, wherein image pairs (T0, T1) from different time instances are subjected to random photometric transformations to obtain two pairs of augmented images (T0→T0', T0"; T1→T1', T1"), which augmented images are passed into an encoder (fθ) and a projection head (gϕ) to provide corresponding feature representations, wherein absolute feature differencing is applied over the outputs of the projection head (gϕ) to obtain difference representations (d1, d2) of changed features between the pair of images.

A network and method are described in the nonpublished U.S. patent application Ser. No. 17/502,729, filed Oct. 15, 2021, entitled "Differencing Based Self-Supervised Pre-training for Change Detection (D-SSCD)", which prior filed patent application shall be incorporated by reference herein.

Scene change detection (SCD) is a critical perception task in the field of computer vision that helps to identify the changes between images of the scene captured at different times.

SCD is challenging due to noisy changes in illumination, seasonal variations, and perspective differences across a pair of views. It plays a crucial role in real-world applications such as ecosystem monitoring, urban expansion, remote sensing, damage assessment, and Automotive High-Definition map maintenance. Deep Neural Network (DNNs) based scene change detection methods hinge on the availability of large-scale labelled images. These images and large-scale collection and annotation of SCD datasets are difficult to obtain as they are labour-intensive and time-consuming.

Background Art

To address the dependency on labeled data, various prior art SCD approaches initially pretrain their models on the large-scale ImageNet in a supervised manner and later finetune with large amounts of pixel-level annotations on domain-specific dataset. ImageNet is known from Deng, J., Dong, W., Socher, R., Li, L. J., Li, K. and Fei-Fei, L., 2009, June. ImageNet: A large-scale hierarchical image database. In 2009 IEEE conference on computer vision and pattern recognition (pp. 384 248-255) IEEE.

However, there still exists the problem of domain shift as the distribution of the ImageNet data widely differs from that of SCD datasets. This domain shift leads to the degradation of change detection performance in prior art SCD methods.

BRIEF SUMMARY OF THE INVENTION

One of the objects of the various embodiments of the present invention is to reduce the large dependency of these current scene change detection methods based on large-scale labelled data and to avoid the need to pre-train on additional large-scale labelled data. Additionally, embodiments of the present invention address additional challenges in SCD such as are caused by noisy changes in illumination, view-point difference and seasonal variations.

According to an embodiment of the present invention, a computer implemented network for executing a self-supervised scene change detection method is proposed wherein a self-supervised objective function (LSSL) is applied on the difference representations d1 and d2 to maximize a cross-correlation of the changed features, wherein d1 and d2 are defined as $$d_1 = |g(f(T_0')) - g(f(T_0''))| \quad (1)$$

$$d_2 = |g(f(T_0'')) - g(f(T_1''))| $$

Advantageously, the computer implemented network of the invention is preferably trained using said self-supervised objective function comprising a weighted balance of a self-supervised loss, a temporal alignment loss, and a change consistency loss.

It is remarked that embodiments of the present invention (D-SSCD) can potentially be exploited to enhance the performance and robustness in any application of change detection where the labeled data is scarce and expensive to obtain. Some such real-world applications such as ecosystem monitoring, urban expansion, damage assessment, and Autonomous HD map maintenance have an immensely positive impact on society. For instance, in the application of urban expansion and disaster assessment, it is important to identify the damages caused due to natural disasters such as tsunami. Owing to the difficulty in obtaining labeled data, the network and method of the invention can help in estimating the damages and help the government in making crucial decisions. Additionally, embodiments of the present invention can also be used in medical applications to estimate disease severity by detecting the changes from medical images. This can potentially help clinicians to make timely decisions, thus saving a patient's life. Thus, the invention has potentially a broad impact in above-mentioned applications which are clearly beneficial to society.

Suitably in the computer implemented network and method of the invention a self-supervised loss function is defined as $$\mathcal{L}_{SSL} \triangleq \underbrace{\sum_i (1 - C_{ii}^2)}_{\text{Invariance term}} + \underbrace{\lambda \sum_i \sum_{j \neq i} C_{ij}^2}_{\text{Redundancy reduction term}} \quad (2)$$

$$C_{ij} \triangleq \frac{\sum_b (d_1)_{b,i}(d_2)_{b,j}}{\sqrt{\sum_b ((d_1)_{b,i})^2}\sqrt{\sum_b ((d_2)_{b,i})^2}} \quad (3)$$

wherein λ is a trade-off constant between invariance and redundancy reduction term, C is a cross-correlation matrix calculated between the difference representations (d1; d2) along batch samples b, and i, j index a vector dimension of the network outputs.

So as to achieve invariant prediction, it is preferred that the augmented images (T0→T0', T0"; T1→T1', T1") are processed by a regularizer to enforce invariance between the images, which regularizer is defined as $$\mathcal{D}_{JS}^{t_0} = 1/2 * (\mathcal{KL}(\sigma(z_0') \| M_1) + \mathcal{KL}(\sigma(z_0'') \| M_1)) \quad (4)$$

$$\mathcal{D}_{JS}^{t_1} = 1/2 * (\mathcal{KL}(\sigma(z_0') \| M_2) + \mathcal{KL}(\sigma(z_0'') \| M_2))$$

$$\mathcal{L}_{TA} = \mathcal{D}_{JS}^{t_0} + \mathcal{D}_{JS}^{t_1}$$

wherein, M1=½*(σ(z'0)+σ(z"0)); M2=½*(σ(z'1)+σ(z"1) are the mean probabilities belonging to the corresponding features, DJ S is the known Jenson Shannon divergence between intra-view features in the probability distribution space, and σ is a Softmax function.

Beneficially, in an embodiment of a computer implemented network and method of the invention, the feature space of temporal image pairs are aligned by applying a change consistency regularization to preserve semantic similarity between temporal images in feature space.

Preferably the change consistency regularization is provided by $$\mathcal{L}_{CR} = \frac{1}{b^2}\|G_t - G_s\|_F^2 \quad (5)$$

wherein a pair-wise similarity between f'0 and f'1 is given by Gt=f'0·f'T1, and Gs=f"0·P'T1 represents the pair-wise similarity matrix between f"0 and f"1.

BRIEF DESCRIPTION OF THE SEVERAL VIEWS OF THE DRAWINGS

The invention will hereinafter be further elucidated with reference to the drawing of an exemplary embodiment of the network and method of the invention that is not limiting as to the appended claims.

In FIG. 1, a network according to an embodiment of the present invention is shown employing a differencing based self-supervised pretraining called D-SSCD that maximizes the correlation of the changed regions to learn distinctive representations that are vital for SCD.

DETAILED DESCRIPTION OF THE INVENTION

Preferably, image pairs (T0, T1) are obtained from different time instances as inputs. Random transformations such as colour distortions and Gaussian blur are applied to this input image pair to obtain two pairs of augmented images.

The augmented image pairs are passed into a same encoder (fθ) and projection head (gθ) to output the corresponding feature representations. Here, the encoder refers to a Convolutional Neural Network (CNN) with multiple layers that helps to extract the information from the images and the projection head refers to a Multi-level Perceptron (MLP) layer with non-linear activation function in between them. The model parameters (θ) are shared.

To learn the representation of the changed features between the pair of images directly, absolute feature differencing is applied over the outputs of the projection head to obtain difference representations (d1, d2);

$$d_1 = |g(f(T_0')) - g(f(T_0'))| \quad (1)$$
$$d_2 = |g(f(T_0'')) - g(f(T_1''))|$$

The model is constrained under the assumption that semantic changes between the image features (T'0, T'1 and T"0, T"1) should remain the same irrespective of the applied augmentations, i.e. d1≅d2. Therefore, a Self-supervised objective function (LSSL) as discussed hereinafter is applied on the difference representations d1 and d2 to maximize the cross-correlation of the changed features. In this way, the model is encouraged to learn task-specific information about the relevant changes that occur between the image pairs. After the pretraining step, the parameters of the encoder fθ are transferred to the downstream task of change detection.

The Loss Function

In the following three objective functions are disclosed that are used for training the proposed D-SSCD network: Self-supervised loss, Temporal Alignment loss (TA), and Change consistency loss. The D-SSCD network is trained in a self-supervised manner using the objective function proposed by [1] as shown in equation 2. Unlike [1] where the cross-correlation of the transformed views of the same image are maximized to be closer to the identity matrix, in the invention the cross-correlation of the different representations are increased between the corresponding image pair taken at different times to be closer in the feature space.

$$\mathcal{L}_{SSL} \triangleq \underbrace{\sum_i (1 - C_{ii}^2)}_{\text{Invariance term}} + \underbrace{\lambda \sum_i \sum_{j \neq i} C_{ij}^2}_{\text{Redundancy reduction term}} \quad (2)$$

$$C_{ij} \triangleq \frac{\sum_b (d_1)_{b,i}(d_2)_{b,j}}{\sqrt{\sum_b ((d_1)_{b,i})^2}\sqrt{\sum_b ((d_2)_{b,i})^2}} \quad (3)$$

wherein λ is a trade-off constant between invariance and redundancy reduction term, C is the cross-correlation matrix calculated between the difference representations (d1 and d2) along the batch samples b and i, j index the vector dimension of the network outputs. This objective function has two components: to note:

(1) the invariance term that makes the difference representations of the augmented input image pair (T'0, T'1); (T"0, T"1) invariant to the presence of noisy changes (e.g., illuminations) by maximizing the diagonal components of the cross-correlation matrix close to identity matrix.

(2) the redundancy reduction term tries to decorrelate the off-diagonal components of the cross-correlation matrix and thus, aligning the difference representations (d1, d2) to be similar.

It is remarked that the model and network is not restricted to this particular SSL loss, which is used to achieve self-supervised change detection.

Invariant Prediction

To achieve invariant prediction, we propose to explicitly enforce invariance under augmentations of intra-view (T'0, T"0; T'1, T"1) features through a regularizer (See equation 4). In the invention the Jensen-Shannon divergence (DJ S) is employed as a regularizer for this Temporal Alignment.

$$\mathcal{D}_{JS}^{t_0} = 1/2 * (\mathcal{KL}(\sigma(z_0')\|M_1) + \mathcal{KL}(\sigma(z_0'')\|M_1)) \quad (4)$$
$$\mathcal{D}_{JS}^{t_1} = 1/2 * (\mathcal{KL}(\sigma(z_0')\|M_2) + \mathcal{KL}(\sigma(z_0'')\|M_2))$$
$$\mathcal{L}_{TA} = \mathcal{D}_{JS}^{t_0} + \mathcal{D}_{JS}^{t_1}$$

wherein M1=½*(σ(z'0)+σ(z"0)); M2=½+(σ(z'1)+σ(z"1)) are the mean probabilities belonging to the corresponding features, DJ S is the Jenson Shannon divergence between the intra-view features in the probability distribution space, and σ is the Softmax function.

Change Consistency Regularization

Since change detection involves images that are taken over time, these images are predominantly affected by the noisy changes in illumination, seasonal variations, and viewpoint differences which makes it challenging to detect the relevant changes. Therefore, it is important to align the feature space of temporal image pairs as the prior probability of occurrence of change is less compared to no change. To achieve this, the invention employs a change consistency Regularization to preserve the semantic similarity between temporal images in the feature space. From [2] it is known to observe semantically similar inputs which tend to produce similar activation patterns in a trained network. In the invention the encoder of the D-SSCD network is enforced to elicit similar activations of the image pairs taken at different times. In this way, the D-SSCD model is more robust to noisy changes during the pretraining stage. Given an input mini-batch, the activation map produced by the encoder of the D-SSCD network for transformed T0 images is given by f'0∈ R b×c×h×w and f"0∈ R b×c×h×w, where b is the batch size, c is the number of output channels and h and w are the spatial dimensions. Similarly, let the activation map produced by the encoder for transformed T1 images be denoted as f'1 and f"1. Note that the dimensions of the activation maps for both the image pairs will be the same as they are produced by same encoder. To incorporate the temporal consistency across T0 and T1 images in the feature space, a pair-wise similarity is construed between f'0 and f'1 given by, Gt=f'0·f'T1. Analogously, let Gs=f"0·f"T1 be the pair-wise similarity matrix between f"0 and f"1. The change consistency regularization is then defined as shown in equation 5.

$$\mathcal{L}_{CR} = \frac{1}{b^2}\|G_t - G_s\|_F^2 \quad (5)$$

Overall Loss

The overall objective for the D-SSCD network is the weighted sum of SSL loss, Temporal Alignment (TA) loss and change consistency regularization. The final loss is given in Equation 6.

$$\mathcal{L}_T = \mathcal{L}_{SSL} + \alpha \mathcal{L}_{TA} + \beta \mathcal{L}_{CR} \quad (6)$$

wherein $\alpha$ and $\beta$ are the loss balancing weights.

Embodiments of the present invention can include every combination of features that are disclosed herein independently from each other. Although the invention has been discussed in the foregoing with reference to an exemplary embodiment of the method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

Optionally, embodiments of the present invention can include a general or specific purpose computer or distributed system programmed with computer software implementing steps described above, which computer software may be in any appropriate computer language, including but not limited to C++, FORTRAN, ALGOL, BASIC, Java, Python, Linux, assembly language, microcode, distributed programming languages, etc.

The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

LITERATURE

1. Zbontar, J., Jing, L., Misra, I., LeCun, Y. and Deny, S., 2021, July. Barlow twins: Self-supervised learning via redundancy reduction. In *International Conference on Machine Learning* (pp. 12310-12320). PMLR.
2. Tung, F. and Mori, G., 2019. Similarity-preserving knowledge distillation. In *Proceedings of the IEEE/CVF International Conference on Computer Vision* (pp. 1365-1374).
3. Pablo F Alcantarilla, Simon Stent, German Ros, Roberto Arroyo, and Riccardo Gherardi. Street-view change detection with deconvolutional networks. Autonomous Robots, 42(7):1301-1322, 2018.
4. Enqiang Guo, Xinsha Fu, Jiawei Zhu, Min Deng, Yu Liu, Qing Zhu, and Haifeng Li. Learning to measure change: Fully convolutional siamese metric networks for scene change detection. arXiv preprint arXiv:1810.09111, 2018.
5. Yinjie Lei, Duo Peng, Pingping Zhang, Qiuhong Ke, and Haifeng Li. Hierarchical paired channel fusion network for street scene change detection. IEEE Transactions on Image Processing, 30:55-67, 2020.
6. Ken Sakurada, Mikiya Shibuya, and Weimin Wang. Weakly supervised silhouette-based semantic scene change detection. In 2020 IEEE International conference on robotics and automation (ICRA), pp. 6861-6867. IEEE, 2020

The invention claimed is:

1. A computer implemented network for executing a self-supervised scene change detection method, wherein image pairs (T0, T1) from different time instances are subjected to random photometric transformations to obtain two pairs of augmented images (T0→T0', T0'"; T1→T1', T1"), which augmented images are passed into an encoder (fθ) and a projection head (gφ) to provide corresponding feature representations, wherein absolute feature differencing is applied over the outputs of the projection head (gφ) to obtain difference representations (d1, d2) of changed features between the pair of images, and wherein a self-supervised objective function (LSSL) is applied on the difference representations d1 and d2 to maximize a cross-correlation of the changed features, wherein d1 and d2 are defined as $$d_1 = |g(f(T'_0)) - g(f(T'_0))| \quad (1)$$
$$d_2 = |g(f(T''_0)) - g(f(T''_1))|$$

and wherein the feature space of temporal image pairs are aligned by applying a change consistency regularization to preserve semantic similarity between temporal images in feature space.

2. The computer implemented network and method of claim 1, wherein the network is trained using said self-supervised objective function comprising a weighted balance of a self-supervised loss, a temporal alignment loss, and a change consistency loss.

3. The computer implemented network and method of claim 2, wherein a self-supervised loss function is defined as $$\mathcal{L}_{SSL} \triangleq \underbrace{\sum_i (1 - C_{ii}^2)}_{\text{Invariance term}} + \underbrace{\lambda \sum_i \sum_{j \neq i} C_{ij}^2}_{\text{Redundancy reduction term}} \quad (2)$$

$$C_{ij} \triangleq \frac{\sum_b (d_1)_{b,i}(d_2)_{b,j}}{\sqrt{\sum_b ((d_1)_{b,i})^2} \sqrt{\sum_b ((d_2)_{b,i})^2}} \quad (3)$$

wherein λ is a trade-off constant between invariance and redundancy reduction term, C is a cross-correlation matrix calculated between the difference representations (d1; d2) along batch samples b, and i, j index a vector dimension of the network outputs.

4. The computer implemented network and method of claim 1, wherein the augmented images (T0→T0', T0''; T1→T1', T1'') are processed by a regularizer to enforce invariance between the images, which regularizer is defined as $$\mathcal{D}_{JS}^{t0} = 1/2 * (\mathcal{KL}(\sigma(z'_0)\|M_1) + \mathcal{KL}(\sigma(z''_0)\|M_1)) \quad (4)$$
$$\mathcal{D}_{JS}^{t1} = 1/2 * (\mathcal{KL}(\sigma(z'_0)\|M_2) + \mathcal{KL}(\sigma(z''_0)\|M_2))$$
$$\mathcal{L}_{TA} = \mathcal{D}_{JS}^{t0} + \mathcal{D}_{JS}^{t1}$$

wherein, M1=½*(σ(z'0)+σ(z"0)); M2=½*(σ(z'1)+σ(z" 1)) are the mean probabilities belonging to the corresponding features, DJ S is the known Jenson Shannon divergence between intra-view features in the probability distribution space, and σ is a Softmax function.

5. The computer implemented network and method of claim 1, wherein the change consistency regularization is provided by $$\mathcal{L}_{CR} = \frac{1}{b^2}\|G_t - G_s\|_F^2 \quad (5)$$

wherein a pair-wise similarity between f'0 and f'1 is given by Gt=f'0·fT1, and Gs=f"0·f"T1 represents the pair-wise similarity matrix between f"0 and f"1.

* * * * *